United States Patent [19]

Brake et al.

[11] Patent Number: 5,340,860
[45] Date of Patent: Aug. 23, 1994

[54] LOW FLUID LOSS CEMENT COMPOSITIONS, FLUID LOSS REDUCING ADDITIVES AND METHODS

[75] Inventors: Bobby G. Brake; Jiten Chatterji, both of Duncan, Okla.

[73] Assignee: Halliburton Company, Duncan, Okla.

[21] Appl. No.: 968,963

[22] Filed: Oct. 30, 1992

[51] Int. Cl.$^5$ .................. C08K 5/42; C08K 7/00; C09K 3/00
[52] U.S. Cl. .................. 524/166; 523/130; 252/8.551; 166/295
[58] Field of Search .................. 524/166; 523/130; 166/295; 252/8.551

[56] References Cited

U.S. PATENT DOCUMENTS

| | | | |
|---|---|---|---|
| 3,359,225 | 12/1967 | Weisend | 260/29.6 |
| 3,891,454 | 6/1975 | Cunningham et al. | 106/89 |
| 4,632,186 | 12/1986 | Boncan et al. | 523/130 |
| 4,703,801 | 11/1987 | Fry et al. | 166/293 |
| 4,742,094 | 5/1988 | Brothers et al. | 523/130 |
| 4,791,989 | 12/1988 | Brothers et al. | 166/293 |
| 4,986,355 | 1/1991 | Casad et al. | 523/130 |
| 5,025,040 | 6/1991 | Crema et al. | 523/130 |
| 5,092,935 | 3/1992 | Crema et al. | 523/130 |

*Primary Examiner*—Kriellion S. Morgan
*Attorney, Agent, or Firm*—Robert A. Kent; Thomas R. Weaver; C. Clark Dougherty, Jr.

[57] ABSTRACT

Improved liquid fluid loss reducing additives, well cement compositions containing the additives and methods of using the compositions are provided by this invention. The liquid fluid loss reducing additives are basically comprised of water, polyethylene imine, an alkali metal salt of alkylbenzene sulfonic acid and an alkali metal salt of naphthalene sulfonic acid condensed with formaldehyde.

20 Claims, No Drawings

LOW FLUID LOSS CEMENT COMPOSITIONS, FLUID LOSS REDUCING ADDITIVES AND METHODS

BACKGROUND OF THE INVENTION

1. Field of the Invention

This invention relates generally to low fluid loss cement compositions, fluid loss reducing additives and methods of using the cement compositions in well cementing operations.

2. Description of the Prior Art

Hydraulic cement compositions are utilized extensively in the construction and repair of oil, gas and water wells. For example, hydraulic cement compositions are used in primary well cementing operations which involve the placement of a cement composition into the annular space between the walls of the well bore and the exterior of a pipe such as casing disposed therein. The cement composition is permitted to set in the annular space thereby forming an annular sheath of hardened impermeable cement therein. The objective of the cement sheath is to physically support and position the pipe in the well bore and bond the pipe to the walls of the well bore whereby the undesirable migration of fluids between subterranean zones or formations penetrated by the well bore is prevented.

In the operation of wells after primary cementing and other completion operations have been accomplished and produced fluids have been recovered from one or more subterranean formations penetrated by the well bore, problems relating to the undesirable flow of fluids with or without fine solids into or from locations in subterranean formations or the well bore often occur. Ordinarily, the undesirable passage of fluids involves the movement of oil, gas or water through small holes or cracks in the well casing and/or through holes, cracks, voids or channels in the annular cement sheath between the casing and the walls of the well bore. The problems of undesirable fluids passing through such openings have traditionally been solved by placing hydraulic cement compositions in the openings followed by permitting the cement compositions to harden and form impermeable plugs therein. These remedial techniques are generally referred to in the art as squeeze cementing.

The success of primary cementing, squeeze cementing and other well cementing operations depend, at least in part, on the ability of the hydraulic cement compositions used to retain fluids, e.g., water, until they have been placed in desired locations in wells. That is, as a cement composition is pumped through the well bore and contacts permeable subterranean formations penetrated thereby, water and other liquids included in the cement composition can be lost to the permeable formations. Since a hydraulic cement composition is basically comprised of a water slurry of cement and other solid particles, when portions of the water forming the slurry are lost, the consistency of the composition is also lost which can prevent the composition from being placed in the intended location, from setting into a hard impermeable mass and from achieving the intended cementing result.

Heretofore, a variety of fluid loss reducing additives have been developed and used in well cement compositions. Such additives reduce the loss of liquids from a cement composition when it is in contact with a permeable surface. Both particulate solid and liquid fluid loss reducing additives have been developed, but liquid additives are generally preferred in that they are more readily measured and mixed with a cement composition. However, when exposed to atmospheric air, prior liquid fluid loss reducing additives have often gelled or formed lumps therein making them difficult to measure and mix. Thus, there is a need for improved liquid fluid loss reducing additives which can be repeatedly exposed to atmospheric air without gelling or forming lumps as well as improved low fluid loss cement compositions containing the additives and methods of use.

SUMMARY OF THE INVENTION

The present invention provides improved fluid loss reducing additives, improved low fluid loss cement compositions containing the additives and methods of using the compositions in well operations which overcome the shortcomings of the prior art and meet the needs described above.

The improved liquid fluid loss reducing additives of this invention are basically comprised of water, polyethylene imine, an alkali metal salt of alkylbenzene sulfonic acid and an alkali metal salt of naphthalene sulfonic acid condensed with formaldehyde.

A particularly preferred additive of this invention is comprised of water, polyethylene imine having a molecular weight in the range of about 40,000 to about 60,000 present in the additive in an amount of about 53% by weight of the additive, sodium dodecylbenzene sulfonate present in the additive in an amount of about 3.7% by weight thereof and sodium naphthalene sulfonate condensed with formaldehyde having a molecular weight in the range of about 1400 to about 2400 present in the additive in an amount of about 3.8% by weight thereof.

The low fluid loss cement compositions of this invention are comprised of hydraulic cement, water present in an amount sufficient to form a pumpable slurry and the above described liquid fluid loss reducing additive having an activity in the range of from about 30% to about 50% by weight present in an amount in the range of from about 0.1 gallon to about 10 gallons per sack of cement (94 pounds) in the composition. The methods of using such low fluid loss cementing compositions comprise the steps of placing a low fluid loss cement composition of this invention in a zone to be cemented and allowing the composition to set into a hard mass therein.

It is, therefore, a general object of the present invention to provide improved liquid fluid loss reducing additives, cement compositions containing the additives and methods.

Other and further objects, features and advantages of the invention will be readily apparent to those skilled in the art upon a reading of the description of preferred embodiments which follows.

DESCRIPTION OF PREFERRED EMBODIMENTS

As mentioned above, the low fluid loss cement compositions of the present invention which are advantageously utilized for performing construction and remedial operations in oil and gas wells are comprised of a particulate hydraulic cement, sufficient water to form a pumpable slurry and a liquid fluid loss reducing additive of this invention. The compositions have excellent fluid loss properties and because the liquid fluid loss additive does not gel or form lumps when exposed to air, the cement compositions are readily prepared at the job site just prior to use.

The hydraulic cement utilized in the compositions of this invention can be any of a variety of hydraulic cements. Portland cement is generally preferred and can be, for example, one or more of the various Portland cements designated as API Classes A, C, H and G cements. These cements are identified and defined in the API Specification for Materials and Testing for Well Cements, API Specification 10, 21st Edition, dated Sep. 1, 1991 of the American Petroleum Institute.

The water slurries of hydraulic cement useful herein are formed using a quantity of water sufficient to produce a pumpable slurry of desired density. The water utilized can be fresh water, brine or seawater, and when API Portland cements are utilized, the weight ratio of water to cement generally falls within the range of from about 0.2 pound to about 1.5 pounds of water per pound of cement.

The liquid fluid loss reducing additives of this invention are basically comprised of water, polyethylene imine, an alkali metal salt of alkylbenzene sulfonic acid, and an alkali metal salt of naphthalene sulfonic acid condensed with formaldehyde.

The polyethylene imine utilized in a fluid loss reducing additive of this invention preferably has a molecular weight in the range of from about 40,000 to about 60,000, most preferably a molecular weight of about 55,000. The polyethylene imine is generally present in the additive in an amount in the range of from about 50% to about 55% by weight of the additive, preferably in an amount of about 53% by weight of the additive.

The alkyl group of the alkylbenzene sulfonate preferably contains from about 8 to about 16 carbon atoms. Most preferably, the alkyl group contains about 12 carbon atoms and the alkali metal is sodium, i.e., the alkylbenzene sulfonate is most preferably sodium dodecylbenzene sulfonate. The alkylbenzene sulfonate is generally present in the additive in an amount in the range of from about 3% to about 4% by weight of the additive, preferably in an amount of about 3.7% by weight of the additive.

The condensation reaction product of an alkali metal salt of naphthalene sulfonic acid and formaldehyde preferably has a molecular weight in the range of from about 1400 to about 2400, and is present in the additive in an amount in the range of from about 3% to about 4% by weight of the additive, most preferably in an amount of about 3.8% by weight of the additive. The most preferred condensation product is formed from sodium naphthalene sulfonate and formaldehyde and has a molecular weight of about 1500.

The quantity of liquid fluid loss reducing additive included in a cement composition of this invention can vary depending upon the activity of the aqueous solution forming the additive. When an additive of this invention is indicated to have a certain activity expressed in percent, it means that the aqueous additive solution contains polyethylene imine, alkylbenzene sulfonate and naphthalene sulfonate-formaldehyde condensation reaction product in the stated percent by weight of the solution. Generally, an additive having an activity in the range of from about 30% to about 50% by weight is included in a cement composition in an amount in the range of from about 0.1 gallon to about 10 gallons per 94 pound sack of cement in the composition. An additive having an activity of about 40% is included in a cement composition of this invention in an amount in the range of from about 0.1 gallon to about 5 gallons per 94 pound sack of cement.

A particularly preferred liquid fluid loss reducing additive of this invention is comprised of fresh water, polyethylene imine having a molecular weight of about 55,000 present in the additive in an amount of about 53% by weight thereof, sodium dodecylbenzene sulfonate present in the additive in an amount of about 3.7% by weight thereof and sodium naphthalene sulfonate condensed with formaldehyde having a molecular weight of about 1500 present in the additive in an amount of about 3.8% by weight thereof. The additive has an activity of about 40%.

In preparing a cement composition of this invention, the liquid fluid loss reducing additive is preferably combined with the mixing water prior to the addition of the cement thereto. The cement composition can include other components which are well known to those skilled in the art such as silica flour to prevent cement strength deterioration in high temperature environments, set retarding additives such as aqueous solutions of lignosulfonates, sodium silicate to prevent the formation of free water, dispersing agents and the like.

A preferred cement composition of this invention is comprised of hydraulic cement, sufficient water to form a pumpable slurry and from about 0.1 gallon to about 10 gallons per 94 pound sack of cement of a liquid fluid loss reducing additive having an activity of from about 30% to about 50% comprised of an aqueous solution of polyethylene imine, an alkali metal salt of alkylbenzene sulfonic acid wherein the alkyl group contains from about 8 to about 16 carbon atoms and an alkali metal salt of naphthalene sulfonic acid condensed with formaldehyde.

The most preferred low fluid loss cement composition of this invention is comprised of API Portland cement, sufficient water to form a pumpable slurry and from about 0.1 gallon to about 5.0 gallons per 94 pound sack of cement of a liquid fluid loss reducing additive having an activity of about 40% comprised of water, polyethylene imine having a molecular weight of about 55,000 present in the additive in an amount of about 53% by weight thereof, sodium dodecylbenzene sulfonate present in the additive in an amount of about 3.7% by weight thereof and the condensation product of sodium naphthalene sulfonate and formaldehyde having a molecular weight of about 1500 present in the additive in an amount of about 3.8% by weight thereof.

The methods of this invention for cementing a subterranean zone penetrated by a well bore basically comprise the steps of placing a low fluid loss cement composition of this invention in the zone to be cemented and allowing the composition to set into a hard mass therein. In a well cementing operation known as primary cementing, a conduit such as casing or a liner is disposed in the well bore and a low fluid loss cement composition of this invention is pumped downwardly within the interior of the conduit and upwardly into the annulus between the outside of the conduit and the walls of the well bore. After placement in the annulus, the cement slurry sets into a hard mass whereby the casing or liner is sealingly bonded to the walls of the well bore. Because of the presence of the fluid loss reducing additive in the cement composition, only insubstantial amounts of water are lost from the cement composition during and after placement whereby it sets into a hard impermeable mass having high compressive strength without the presence of cracks, channels, voids or the like therein.

In order to further illustrate the present invention and to facilitate a clear understanding of the improved cement compositions and fluid loss reducing additives of this invention, the following examples are given.

EXAMPLE 1

A number of test cement compositions were prepared as set forth in Table I below.

sation product having a molecular weight of about 1500, 1.151 pounds of 91% active sodium dodecylbenzene sulfonate, and 30 pounds of 50% active polyethyleneimine having a molecular weight of about 55,000. The above described liquid fluid loss reducing additive did not gel or form lumps when exposed to air for long periods of time.

The cement composition containing the liquid fluid loss reducing additive were tested in accordance with standard API procedures for viscosity and fluid loss.

TABLE I

Test Cement Compositions

| Cement Composition No. | Cement | Silica Flour, % by weight of dry cement | Set Retarder | | | | Heavy Weight Additive[5], pounds per 94 pound sack of cement |
|---|---|---|---|---|---|---|---|
| | | | Retarder A[1], % by weight of dry cement | Retarder B[2], % by weight of dry cement | Retarder C[3], % by weight of dry cement | Retarder D[4], gallons per 94 pound sack of cement | |
| 1 | Premium Class H | 35 | 1.3 | — | — | — | — |
| 2 | Premium Class H | 35 | 1.3 | — | — | — | — |
| 3 | Premium Class H | 35 | — | 1.0 | 1.0 | — | 42 |
| 4 | Premium Class H | — | — | — | — | 0.05 | — |
| 5[8] | Premium Class H | 35 | — | 0.5 | 0.8 | — | — |
| 6[9] | Premium Class H | 35 | — | 2.7 | 2.7 | — | 60 |

| Cement Composition No. | Sodium Chloride, pounds per 94 pound sack of cement | Suspending Aid[6], % by weight of dry cement | Dispersing Agent[7], gallons per 94 pound sack of cement | Aqueous NaOH Solution (50% by weight), gallon per 10 bbls of sea water | Fresh Water, gallons per 94 pound sack of cement | Sea Water, gallons per 94 pound sack of cement | Density, pound per gallon |
|---|---|---|---|---|---|---|---|
| 1 | — | — | — | — | 4.7 | — | 16.6 |
| 2 | — | — | — | — | — | 4.7 | 16.6 |
| 3 | 16 | 0.1 | — | — | 5.2 | — | 18.7 |
| 4 | — | — | 0.1 | 0.2 | — | 5.1 | 15.7 |
| 5[8] | — | 0.1 | — | — | 3.37 | — | 17.9 |
| 6[9] | — | 0.6 | — | — | 4.22 | — | 19.0 |

[1]Set retarder comprised of lignosulfonate mixed with hydroxyacetic acid.
[2]Set retarder intensifier comprised of tartaric acid.
[3]Set retarder comprised of a copolymer of AMPS ® and acrylic acid.
[4]Set retarder comprised of aqueous lignosulfonate solution.
[5]Iron oxide (heavy weight additive).
[6]Polysaccharide (suspending aid).
[7]Aqueous solution of naphthalene sulfonic acid condensate.
[8]Composition also contained 0.25% by weight of dry cement of polyol defoamer.
[9]Composition also contained 0.05 gallon per 94 pound sack of cement of silicone defoamer.

Various amounts of the liquid fluid loss reducing additive of this invention were added to the test cement compositions as shown in Table II below. The liquid fluid loss reducing additive was 40% active and was prepared by mixing 11.2 pounds of water, 1.151 pounds of sodium naphthalene sulfonate-formaldehyde conden- The results of these tests are also set forth in Table II below.

TABLE II

| Cement Composition No. | Quantity of Fluid Loss Reducing Additive, gallon per 94 pound sack of cement | Atmospheric Consistometer @ 190° F. (B$_c$) | | Fluid Loss at 1000 psi, cc/30 min. | Fluid Loss Test Temperature |
|---|---|---|---|---|---|
| | | Initial | 20 Minutes | | |
| 1 | 0.5 | 9 | 8 | 14 | 190 |
| 2 | 0.5 | 14 | 10 | 30 | 190 |
| 3 | 0.325 | 11 | 10 | 24 | 190 |
| 4 | 0.2 | 2 | 3 | 110 | 130 |
| 5 | 0.4 | 29 | 15 | 20 | 300[1] |
| 6 | 0.75 | — | — | 14 | 400[2] |

[1]Baroid filter press.
[2]High temperature-high pressure stirring fluid loss cell (Halliburton Publication No. 70.76036).

From Table II it can be seen that the viscosity and fluid loss properties of the tested cement compositions are good.

EXAMPLE 2

Various quantities of the liquid fluid loss reducing additive of this invention described in Example 1 above were added to a number of the test cement compositions listed in Table I. The resulting cement compositions were tested in accordance with API standard procedures for thickening times and 24 compressive strengths. The results of these tests are given in Table III below.

TABLE III

| | Thickening Time and Compressive Strength Tests | | |
|---|---|---|---|
| Cement Composition No. | Quantity of Fluid Loss Reducing Additive, gallon per 94 pound sack of cement | Thickening Time (Hr:Min) 16000' API Casing Schedule @ 292° F. BHCT-16100 psi | 24 Hr Compressive Strength @ BHCT-3000 psi Curing Pressure |
| 1 | 0.5 | 6:45 | 6965 |
| 2 | 0.5 | 6:41 | 7050 |
| 5 | 0.4 | 4:48 | 5150 |
| 3[1] | 0.325 | 5:40 | 1385 |

[1]Tests conducted @ 393° F. BHCT-22000 psi.

From Table III it can be seen that the low fluid loss cement compositions of the present invention have good thickening times and compressive strengths, i.e., the liquid fluid loss reducing additive of this invention did not cause thickening and set time retardation.

Thus, the present invention is well adapted to carry out the objects and attain the ends and advantages mentioned as well as those which are inherent therein. While numerous changes may be made to the invention by those skilled in the art, such changes are encompassed within the spirit of this invention as defined by the appended claims.

What is claimed is:

1. A liquid fluid loss reducing additive for use in well cementing compositions consisting essentially of:
   water;
   polyethylene imine present in said additive in an amount in the range of from about 50% to about 55% by weight of said additive;
   an alkali metal salt of alkylbenzene sulfonic acid present in said additive in an amount in the range of from about 3% to about 4% by weight of said additive; and
   an alkali metal salt of naphthalene sulfonic acid condensed with formaldehyde present in said additive in an amount in the range of from about 3% to about 4% by weight of said additive.

2. The additive of claim 1 wherein said polyethylene imine has a molecular weight in the range of from about 40,000 to about 50,000.

3. The additive of claim 1 wherein the alkyl group of said alkali metal salt of alkylbenzene sulfonic acid contains from about 8 to about 16 carbon atoms.

4. The additive of claim 3 wherein said alkali metal salt of alkylbenzene sulfonic acid is sodium dodecylbenzene sulfonate.

5. The additive of claim 1 wherein said alkali metal salt of naphthalene sulfonic acid which is condensed with formaldehyde is sodium naphthalene sulfonate and the sodium naphthalene sulfonate-formaldehyde condensation product has a molecular weight in the range of from about 1400 to about 2400.

6. The additive of claim 1 wherein said polyethylene imine has a molecular weight of about 55,000 and is present in said additive in an amount of about 53% by weight thereof, said alkali metal salt of alkylbenzene sulfonic acid is sodium dodecylbenzene sulfonate and is present in said additive in an amount of about 3.7% by weight thereof, and said alkali metal salt of naphthalene sulfonic acid condensed with formaldehyde is sodium naphthalene sulfonate, the sodium naphthalene sulfonate-formaldehyde condensation product has a molecular weight of about 1500 and said condensation product is present in said additive in an amount of about 3.8% by weight thereof.

7. A low fluid loss well cementing composition comprising:
   hydraulic cement;
   water present in an amount sufficient to form a pumpable slurry;
   a liquid fluid loss reducing additive consisting essentially of water, polyethylene imine present in said additive in an amount in the range of from about 50% to about 55% by weight of said additive, an alkali metal salt of alkylbenzene sulfonic acid wherein the alkyl group contains from about 8 to about 16 carbon atoms present in said additive in an amount in the range of from about 3% to about 4% by weight of said additive and an alkali metal salt of naphthalene sulfonic acid condensed with formaldehyde present in said additive in an amount in the range of from about 3% to about 4% by weight of said additive.

8. The composition of claim 7 wherein said hydraulic cement is Portland cement.

9. The composition of claim 7 wherein said water is fresh water, salt water or seawater.

10. The composition of claim 7 wherein said liquid fluid loss reducing additive has an activity in the range of from about 30% to about 50% and is present in said composition in an amount in the range of from about 0.1 gallon to about 10 gallons per 94 pound sack of cement therein.

11. The composition of claim 7 wherein said polyethylene imine has a molecular weight in the range of from about 40,000 to about 60,000.

12. The composition of claim 11 wherein said alkali metal salt of alkylbenzene sulfonic acid is sodium dodecylbenzene sulfonate.

13. The composition of claim 12 wherein said alkali metal salt of naphthalene sulfonic acid which is condensed with formaldehyde is sodium naphthalene sulfonate and the sodium naphthalene sulfonate-formaldehyde condensation product has a molecular weight in the range of from about 1400 to about 2400.

14. A method of cementing a subterranean zone penetrated by a well bore comprising the steps of placing a low fluid loss cement composition in said zone and allowing said composition to set into a hard mass therein, said composition being comprised of hydraulic cement, sufficient water to form a pumpable slurry and a liquid fluid loss reducing additive consisting essentially of water, polyethylene imine present in said additive in an amount in the range of from about 50% to about 55% by weight of said additive, an alkali metal salt of alkylbenzene sulfonic acid wherein the alkyl group contains from about 8 to about 16 carbon atoms present in said additive in an amount in the range of from about 3% to about 4% by weight of said additive, and an alkali metal salt of naphthalene sulfonic acid condensed with formaldehyde present in said additive in an amount in the range of from about 3% to about 4% by weight of said additive.

15. The method of claim 14 wherein said hydraulic cement is Portland cement.

16. The method of claim 14 wherein said water is fresh water, salt water or seawater.

17. The method of claim 14 wherein said liquid fluid loss reducing additive has an activity in the range of from about 30% to about 50% and is present in said composition in an amount in the range of from about 0.1 gallon to about 10 gallons per 94 pound sack of cement therein.

18. The method of claim 17 wherein said polyethylene imine has a molecular weight in the range of from about 40,000 to about 60,000.

19. The method of claim 18 wherein said alkali metal salt of alkylbenzene sulfonic acid is sodium dodecylbenzene sulfonate.

20. The method of claim 19 wherein said alkali metal salt of naphthalene sulfonic acid which is condensed with formaldehyde is sodium naphthalene sulfonate and the sodium naphthalene sulfonate-formaldehyde condensation product has a molecular weight in the range of from about 1400 to about 2400.

* * * * *